United States Patent
Tang

(10) Patent No.: US 11,147,013 B2
(45) Date of Patent: Oct. 12, 2021

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/211,762

(22) Filed: Mar. 24, 2021

(65) Prior Publication Data

US 2021/0250855 A1  Aug. 12, 2021

Related U.S. Application Data

(63) Continuation of application No. PCT/CN2018/107367, filed on Sep. 25, 2018.

(51) Int. Cl.
*H04W 52/02* (2009.01)

(52) U.S. Cl.
CPC .............. *H04W 52/02* (2013.01); *Y02D 30/70* (2020.08)

(58) Field of Classification Search
CPC ... H04W 76/28; H04W 52/346; H04W 52/52; H04B 1/3838
See application file for complete search history.

(56) References Cited

U.S. PATENT DOCUMENTS

2012/0021707 A1  1/2012  Forrester et al.
2021/0168736 A1*  6/2021  Cho ...................... H04W 52/52

FOREIGN PATENT DOCUMENTS

CN        104125615 A       10/2014
CN        104937849 A       9/2015

OTHER PUBLICATIONS

WO, International Search Report, PCT/CN2018/107367, dated May 29, 2019, 27 pages.
PCT Written Opinion of the International Searching Authority issued in corresponding International Application No. PCT/CN2018/107367, dated May 29, 2019, 9 pages.
"New WID on Power Class 2 UE for EN-DC (1 LTE band +1 NR band)", Source: CMCC, Agenda Item: 12.2, 3GPP TSG-RAN WG4 Meeting #88, R4-1809888, Gothenburg, SE, Aug. 20-24, 2018, 7 pages.
"Discussion on solutions to satisfy SAR requirements for NR HPUE", Source: CMCC, Agenda Item: 7.4.6.9, 3GPP TSG-RAN WG4 Meeting #86bisM, R4-1804016, Melbourne, AU, Apr. 16-20, 2018, 4 pages.

(Continued)

Primary Examiner — Tu X Nguyen
(74) Attorney, Agent, or Firm — Bayes PLLC

(57) ABSTRACT

A method for wireless communication, applied to a terminal device connecting with a first network and a second network, includes reducing, by the terminal device when an uplink duty cycle of the second network is greater than a maximum uplink duty cycle of the second network, at least one of a power class of the first network and the second network or the uplink duty cycle of the second network. The uplink duty cycle of the second network is a proportion of time domain resources that can be used for uplink transmission in a time unit.

20 Claims, 2 Drawing Sheets

(56) References Cited

OTHER PUBLICATIONS

"Power sharing for EN-DC (MR-DC)", Source: Ericsson, Agenda item: 7.4.11.2, TSG-RAN Working Group 4 (Radio) meeting #86, R4-1802359, Athens, Greece, Feb. 26-Mar. 2, 2018, 2 pages.
"Configured output power for EN-DC", Source: Ericsson, Agenda item: 7.5.6.10, TSG-RAN Working Group 4 (Radio) meeting #87, R4-1806725, Busan, South Korea, May 21-25, 2018, 6 pages.
Supplementary European Search Report issued in corresponding European Application No. EP 18 93 4740.4, dated Jul. 21, 2021, 12 pages.
"Revised WID on 29 dBm UE Power Class for LTE Band 41 and NR Band n41", Agenda Item: 9.2.5, Source: Sprint, CMCC, 3GPP TSG Ran Meeting #81 RP-181655, Gold Coast, Australia, Sept. 10-13, 2018, 4 pages.

\* cited by examiner

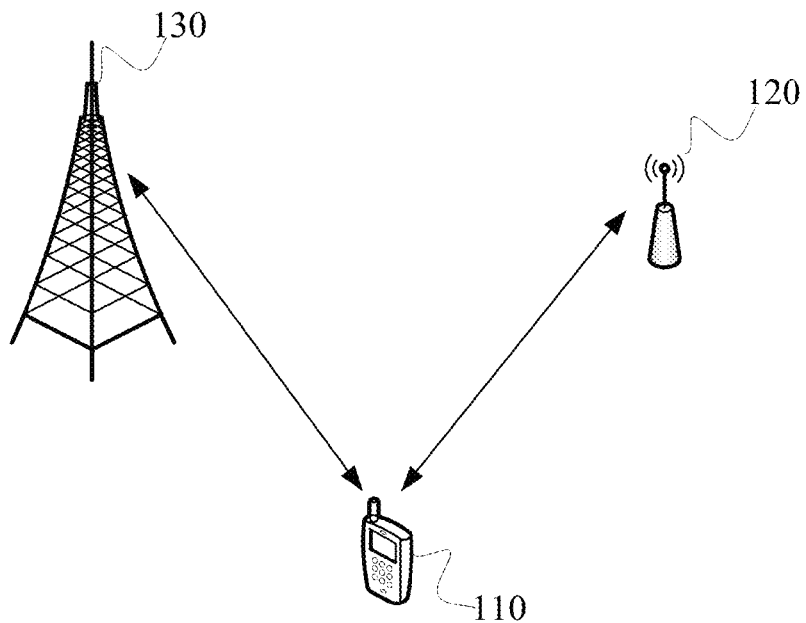

If the uplink duty ratio of a second network is greater than the maximum uplink duty ratio of the second network, the terminal device reduces the total transmit power of a first network and the second network, and/or the uplink duty ratio of the second network, so that the electromagnetic wave specific adsorption rate (SAR) of the terminal device is less than or equal to a preset value — S210

FIG. 2

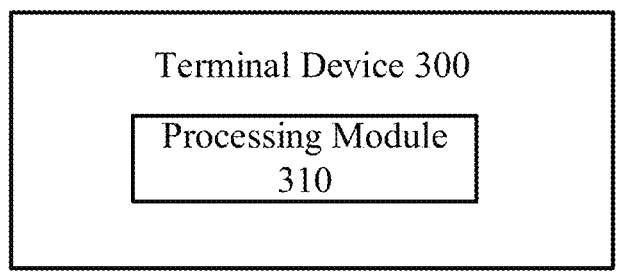

FIG. 3

WIRELESS COMMUNICATION METHOD AND TERMINAL DEVICE

CROSS-REFERENCE TO RELATED APPLICATION

This application is a continuation application of International Application No. PCT/CN2018/107367, filed Sep. 25, 2018, the entire contents of which are incorporated herein by reference.

BACKGROUND

Embodiments of the application relate to the field of communications, and in particular, to a method and a terminal device for wireless communication.

Specific absorption rate (SAR) of electromagnetic waves is used for measuring the intensity of electromagnetic radiation from terminal devices to the human body. Generally speaking, the SAR of terminal devices cannot exceed a specified index limitation.

For terminal devices that support multiple standards, such as long term evolution (LTE) and New Radio (NR) standards, the LTE and NR standards of terminal devices can work simultaneously, while the working frequency bands of the LTE standard and the NR standard are usually different, thereby contributing to the SAR of the terminal devices in an asymmetric manner. In this case, how to prevent the SAR of the terminal devices from exceeding the limit is an urgent problem.

SUMMARY

Embodiments of the application provide a method and a terminal device for wireless communication, which are beneficial to preventing SAR of the terminal device from exceeding the limit.

According to a first aspect, there is provided a method for wireless communication, including reducing, by the terminal device when an uplink duty cycle of the second network is greater than a maximum uplink duty cycle of the second network, a total transmit power of the first network and the second network and/or the uplink duty cycle of the second network, causing a SAR value of the terminal device to be less than or equal to a preset value.

In some embodiments, the uplink duty cycle of the second network is scheduled by a network device in the second network, or is determined autonomously by the terminal device.

In some embodiments, the method further includes: acquiring, by the terminal device, a current uplink-downlink ratio of the first network; determining, by the terminal device, the maximum uplink duty cycle of the second network according to the current uplink-downlink ratio of the first network, and a correspondence between uplink-downlink ratios of the first network and maximum uplink duty cycles of the second network; and reporting, by the terminal device, the maximum uplink duty cycle of the second network to a network device of the second network.

In some embodiments, the correspondence includes a plurality of first correspondences, and each of the first correspondences corresponds to a maximum transmit power of the first network and a maximum transmit power of the second network; the determining, by the terminal device, the maximum uplink duty cycle of the second network according to the current uplink-downlink ratio of the first network, and a correspondence between uplink-downlink ratios of the first network and maximum uplink duty cycles of the second network includes: determining, by the terminal device, the maximum uplink duty cycle of the second network according to the maximum transmit power of the first network, the maximum transmit power of the second network, the current uplink-downlink ratio of the first network, and the plurality of first correspondences.

In some embodiments, the method further includes: determining, by the terminal device, the plurality of first correspondences.

In some embodiments, the determining, by the terminal device, the plurality of first correspondences includes: determining, by adjusting an uplink ratio of the second network when the first network transmits a signal at a specific maximum transmit power and the second network transmits a signal at a specific maximum transmit power, a target uplink duty cycle of the second network when the SAR value reaches the preset value; and determining the target uplink duty cycle of the second network as the maximum uplink duty cycle of the second network corresponding to a first uplink-downlink ratio, wherein the first uplink-downlink ratio is a current uplink-downlink ratio of the first network.

In some embodiments, the specific maximum transmit power of the first network is 23 dBm or 26 dBm, and the specific maximum transmit power of the second network is 23 dBm or 26 dBm.

In some embodiments, the reducing, by the terminal device, the total transmit power of the first network and the second network includes: reducing, by the terminal device, a power value or a power class of the total transmit power.

In some embodiments, the reducing, by the terminal device, the total transmit power of the first network and the second network includes preferentially reducing, by the terminal device when reducing the total transmit power, a transmit power of the second network.

In some embodiments, the reducing, by the terminal device, the total transmit power of the first network and the second network includes: disconnecting, by the terminal device, from the second network while preserving a connection with the second network.

In some embodiments, the disconnecting, by the terminal device, from the second network includes: disconnecting, by the terminal device, from the second network when the uplink ratio of the second network is greater than a first threshold.

In some embodiments, the first threshold is 50%.

In some embodiments, the first network is long term evolution (LTE) network, and the second network is a new radio (NR) network.

According to a second aspect, there is provided a terminal device configured to implement the method according to the foregoing first aspect or any embodiment thereof. Specifically, the terminal device includes a unit configured to implement the method according to the foregoing first aspect or any embodiment thereof.

According to a third aspect, there is provided a terminal device, including a processor and a memory. The memory is configured to store a computer program, and the processor is configured to call and run the computer program stored in the memory, thereby implementing the method according to the foregoing first aspect or any embodiment thereof.

According to a fourth aspect, there is provided a chip configured to implement the method according to the foregoing first aspect or any embodiment thereof.

Specifically, the chip includes a processor, configured to call and run a computer program from a memory, thereby causing an apparatus provided with the chip to implement the method according to the foregoing first aspect or any embodiment thereof.

According to a fifth aspect, there is provided a computer readable storage medium, being used for storing a computer program, wherein the computer program causes a computer to implement the method according to the foregoing first aspect or any embodiment thereof.

According to a sixth aspect, there is provided a computer program product, including computer program instructions that cause a computer to implement the method according to the foregoing first aspect or any embodiment thereof.

According to a seventh aspect, there is provided a computer program which, when running on a computer, causes the computer to implement the method according to the foregoing first aspect or any embodiment thereof.

Based on the above solution, a terminal device supporting multiple standards can reduce the total transmit power or the uplink duty cycle of the secondary network when the uplink duty cycle of the secondary network is greater than the maximum uplink duty cycle of the secondary network, thereby causing the SAR value of the terminal device to be lower than the preset value, which is helpful to avoid the problem of excess SAR for the terminal device.

BRIEF DESCRIPTION OF THE DRAWINGS

FIG. 1 is a schematic diagram illustrating an application scenario according to an embodiment of the application.

FIG. 2 is a flow chart of a wireless communication method according to an embodiment of the application.

FIG. 3 is a block diagram of a terminal device according to an embodiment of the application.

DETAILED DESCRIPTION

Figure 4:
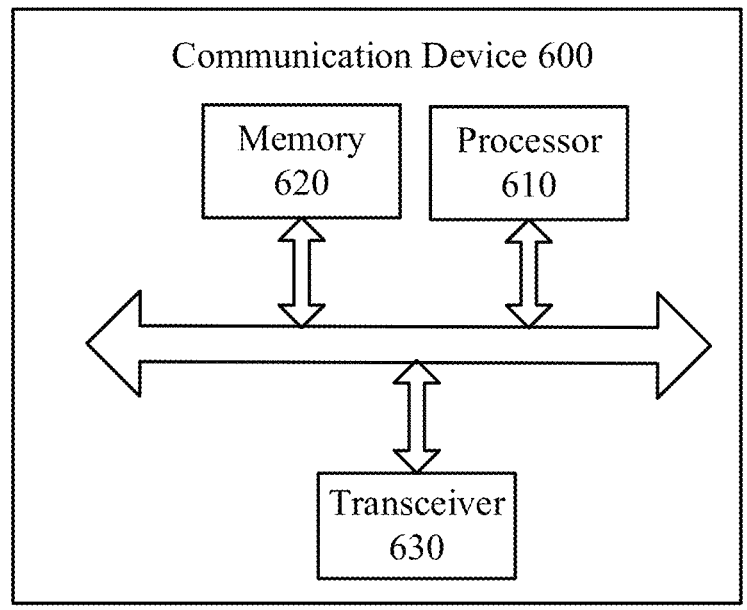
FIG. 4 is a block diagram of a communication device according to another embodiment of the application.

The technical solution according to the embodiments of the application will be described below with reference to the drawings in some embodiments of the application. Obviously, the described embodiments are part of the embodiments of the application, but not all of the embodiments. Based on the embodiments in the application, all other embodiments acquired by a person of ordinary skill in the art without creative efforts shall fall within the protection scope of the application.

Embodiments of the application can be applied to various communication systems, for example, Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunication System (UMTS), Worldwide Interoperability for Microwave Access (WiMAX) communication system, 5G system and the like.

For example, FIG. 1 is a schematic diagram illustrating an application scenario according to an embodiment of the application.

As shown in FIG. 1, a terminal device 110 is connected to a first network device 130 in a first communication system and a second network device 120 in a second communication system. For example, the first network device 130 is a network device in long-term evolution (LTE), and the second network device 120 is a network device in New Radio (NR).

The first network device 130 and the second network device 120 may include multiple cells.

It should be understood that FIG. 1 is an example of a scenario according to an embodiment of the application, and the embodiments of the application are not limited thereto.

For example, the communication system adapted in the embodiments of the application may include at least multiple network devices in the first communication system and/or multiple network devices in the second communication system.

As another example, the first communication system and the second communication system in the embodiments of the application are different, but the specific types of the first communication system and the second communication system are not limited. For example, the first communication system and the second communication system may be various communication systems, such as GSM system, CDMA system, WCDMA system, GPRS, LTE system, LTE TDD, UMTS, and the like.

The network device in the embodiments of the application may refer to any entity at the network side for sending or receiving signals. For example, it may be user equipment of machine type communication (MTC), base transceiver station (BTS) in GSM or CDMA, NodeB in WCDMA, evolutionary NodeB (eNB or eNodeB) in LTE, base station in 5G networks, and the like.

The terminal device 110 may be any terminal device. Specifically, the terminal device may communicate with one or more core networks through a radio access network (RAN), and may also be referred to as an access terminal, user equipment (UE), user unit, user station, mobile station, mobile site, remote station, remote terminal, mobile device, user terminal, terminal, wireless communication device, user agent, or user device. For example, it can be a cellular phone, a cordless phone, a session initiation protocol (SIP) phone, a wireless local loop (WLL) station, a personal digital processing (PDA), a handheld device or computing device having a wireless communication function, other processing devices, in-vehicle devices, wearable devices connected to wireless modems, or a terminal device in 5G networks.

Optionally, the communication system may further include other network entities such as a network controller, a mobility management entity, and the like, the embodiments of the application are not limited thereto.

It should be understood that the terms "system" and "network" are often used interchangeably herein. The term "and/or" in this document is only a kind of association relationship describing related objects, which means that there can be three kinds of relationships, for example, A and/or B may refer to three cases: A exists alone, A and B exist simultaneously, or B exists alone. In addition, the character "/" in this article generally indicates that the related objects are in an "or" relationship.

In the NR communication system, a dual connection (DC) scenario may include (LTE NR DC, EN-DC), (NR eLTE DC, NE-DC), (5GC eLTE NR DC, 5GC-EN-DC), NR DC. Among them, the EN-DC uses LTE nodes as the master nodes (MN), and NR nodes as slave nodes (SN) to connect evolved packet core (EPC) core network. In the NE-DC, the NR serves as the MN, and the evolved long term evolution (eLTE) serves as the SN, and connect to the 5-generation core (5GC). In 5GC-EN-DC, eLTE serves as the MN, and NR serves as the SN to connect to the 5GC. In NR DC, NR serves as MN, NR serves as SN to connect to the 5GC.

In the embodiments of the application, the terminal device may be connected to multiple different networks at the same time. For example, in the EN-DC scenario, the terminal device is connected to the eLTE network and the NR network at the same time. The terminal device in this scenario may be referred to as an EN-DC terminal or a NE-DC terminal.

FIG. 2 is a schematic flowchart of a wireless communication method according to an embodiment of the application. The method 200 may be performed by a terminal device that is connected to a first network and a second network at the same time. As shown in FIG. 2, The method 200 includes the following content.

In S210, when an uplink duty cycle of the second network is greater than a maximum uplink duty cycle of the second network, the terminal device reduces a total transmit power of the first network and the second network and/or the uplink duty cycle of the second network, causing an SAR value of the terminal device to be less than or equal to a preset value.

Optionally, in some embodiments of the application, the first network is a primary network and the second network is a secondary network, that is, a connection between the terminal device and the first network is a primary connection, and a connection between the terminal device and the second network is a secondary connection.

By way of example without limitation, the first network may be LTE network, and the second network may be NR network. In this case, the terminal device may be referred to as an EN-DC terminal. Alternatively, the first network may be NR network. And the second network may be LTE network. In this case, the terminal device may be referred to as an NE-DC terminal. In the following description, an example will be described in which the first network is an LTE network and the second network is an NR network, but the embodiments of the application are not limited thereto.

Optionally, in some embodiments of the application, the preset value of SAR may be a value prescribed by the standard. The SAR value may be preset in the terminal device, and is used for indicating a requirement of electromagnetic radiation intensity of the terminal device.

Generally, the LTE network and the NR network correspond to different frequency bands and can transmit signals through different antennas. Therefore, the SARs brought by the LTE network and the NR network are different. The SAR of the terminal device is the total SAR of the first network and the second network, which may be affected by transmit power and uplink duty cycle. Generally speaking, the larger the transmit power, the larger the SAR; the larger the uplink duty cycle, and the larger the SAR. Therefore, the SAR of the terminal device can be adjusted by adjusting the transmit power or uplink duty cycle.

It should be noted that, in the embodiments of the application, the uplink duty cycle of the NR network may be considered as a proportion of time domain resources that can be used for uplink transmission in a time unit. Optionally, the time unit may include one or more subframes, and may also include one or more time slots, or may include one or more micro time slots, and the like, which is not limited in the embodiments of the application. Assuming that there are 10 time slots in one subframe, when 3 of the 10 time slots can be used for uplink transmission and 7 time slots can be used for downlink transmission, the uplink duty cycle is 30%.

It should be understood that in the embodiments of the application, the uplink-downlink ratio of the NR network (that is, the ratio of resources used for uplink transmission to resources used for downlink transmission in a time unit) may also be used for determining whether the power adjustment is required to reduce the SAR of the terminal device, which is not limited in the embodiments of the application.

It should also be understood that in the embodiments of the application, the uplink-downlink ratio of the LTE network can be understood as the ratio of the resources used for uplink transmission to the resources used for downlink transmission in one time unit. The uplink-downlink ratio of the LTE network can also be represented by the uplink duty cycle of the LTE network, which is not limited in the embodiments of the application. In the following, the uplink-downlink ratio of the LTE network and the uplink duty cycle of the NR network are taken as examples to describe the embodiments of the application.

In some embodiments of the application, the uplink-downlink ratio of the LTE network is usually configured statically or semi-statically, for example, 60%, 50%, 40%, 30%, 25%, 10%, or the like. Therefore, the SAR of the LTE network is mainly affected by the transmit power. The uplink duty cycle of the NR network is usually semi-statically or dynamically configured. In other words, the uplink-downlink ratio of the terminal device at the LTE network side is usually constant, while the uplink duty cycle at the NR network side can be dynamically adjusted, and a window length of the uplink duty cycle can be any value. Therefore, the SAR value of the NR network is affected by the transmit power and the uplink duty cycle.

In some embodiments of the application, the LTE network can support multiple uplink-downlink ratios, for example, 60%, 50%, 40%, 30%, 25%, or 10%. The terminal device can determine, corresponding to each uplink-downlink ratio, a maximum uplink duty cycle (maxUplinkDutyCycle) of the NR network. Specifically, when the uplink-downlink ratio of the LTE network is a first uplink-downlink ratio, the terminal device controls both the LTE network and the NR network to transmit signals at the maximum transmit power. Then the uplink duty cycle of the NR network is adjusted, and the SAR of the terminal device is measured. The uplink duty cycle of the NR network when the SAR reaches the preset value is recorded as a target uplink duty cycle. Further, the maximum uplink duty cycle of the NR network corresponding to the first uplink-downlink ratio of the LTE network is determined as the target uplink duty cycle. According to the above steps, the terminal device can determine the maximum uplink duty cycle of the NR network corresponding to other ones of uplink-downlink ratios of the LTE network, thereby obtaining the correspondence.

Optionally, in some embodiments of the application, there may be multiple maximum transmit powers of the LTE network and the NR network, such as 26 decibel milliwatts (dBm) or 23 dBm, and the correspondence may correspond to a specific maximum transmit power of the LTE network and a specific maximum transmit power of the NR network, that is, there may be a variety of correspondences, respectively corresponding to different combinations of the maximum transmit power of the LTE network and the maximum transmit power of the NR network.

For example, the terminal device may determine a correspondence when the maximum transmit power of the LTE network, and the maximum transmit power of the NR network are both 23 dBm, or may determine a correspondence when the maximum transmit power of the LTE network is 26 dBm, and the maximum transmit power of the NR network is 23 dBm.

When accessing the LTE network, the terminal device can learn the uplink configuration information of the LTE network, including the uplink-downlink ratio of the LTE network, according to the system broadcast message of the LTE network. Then the terminal device can determine, based on the uplink-downlink ratio in combination with the correspondence, the maximum duty cycle of the NR network. Further, the terminal device reports the maximum uplink duty cycle of the NR network to the network device of the NR network, so that the network device of the NR network can determine the uplink and downlink scheduling of the terminal device in the NR network.

Optionally, in some embodiments, the terminal device may also send the correspondence to the network device of the NR network. After the terminal device learns the uplink-downlink ratio of the LTE network, the terminal device may send the uplink-downlink ratio of the LTE network to the network device of the NR network, so that the network device of the NR network can determine the maximum duty cycle of the NR network according to the uplink-downlink ratio of the LTE network and the correspondence. Further, during the uplink and downlink scheduling, the network device of the NR network can control in such a way that the uplink duty cycle of the NR network is less than or equal to the maximum duty cycle to avoid the SAR of the terminal device from exceeding the limit.

Optionally, in some embodiments of the application, when the uplink duty cycle of the NR network is greater than the maximum duty cycle of the NR network, which corresponds to the current uplink and downlink timeslot ratio of the LTE network, the terminal device has a risk of exceeding the SAR limitation. Therefore, the terminal device can reduce the total transmit power of the LTE network and the NR network or reduce the uplink duty cycle of the NR network. Optionally, the terminal device may not send uplink data in a time unit capable of uplink transmission.

Optionally, in some embodiments of the application, the uplink duty cycle of the second network is scheduled by a network device in the second network, or is determined autonomously by the terminal device.

In other words, the uplink transmission of the terminal device may be an uplink transmission scheduled by the network device, or an uplink transmission initiated autonomously by the terminal device.

In some embodiments, when the connection between the terminal device and the LTE network is the primary connection, the terminal device preferentially reduces the transmit power of the NR network. Alternatively, as another embodiment, when the connection between the terminal device and the NR network is the primary connection, the terminal device preferentially reduces the transmit power of the LTE network to reduce the SAR of the terminal device.

Optionally, as an embodiment, when a degree of reduction of the transmit power of the NR network is greater than a certain threshold, for example, the transmit power of the NR network is reduced by 3 dB. In this case, it can be considered that the signal of the NR network is weak enough to be insufficient for supporting the communication connection between the NR network side and the terminal device. Therefore, the terminal device can disconnect the connection with the NR network and only retain the connection with the LTE network.

Optionally, as another embodiment, when the uplink duty cycle of the second network is greater than a certain threshold, for example, 50%, in this case, even if the transmit power of the NR network is reduced, there is also a risk that the SAR of the terminal device may exceed the limitation.

Therefore, the terminal device can choose to disconnect from the NR network and only retain the connection to the LTE network.

That is to say, in some embodiments of the application, when the SAR of the terminal device has a risk of exceeding the limitation, the terminal device may choose not to use or reduce the use of the secondary network for data transmission, so as to reduce the contribution of the secondary network to the SAR of the terminal device.

The method embodiments of the application have been described in detail above with reference to FIG. 2. The device embodiments of the application will be described in detail below with reference to FIG. 3. It should be understood that the device embodiments correspond to the method embodiments, and similar descriptions may refer to the method embodiments.

FIG. 3 is a block diagram of a terminal device according to an embodiment of the application. The terminal device 300 establishes a connection with the first network and the second network at the same time. As shown in FIG. 3, the terminal device 300 includes: a processing module 310, configured to reduce, when an uplink duty cycle of the second network is greater than a maximum uplink duty cycle of the second network, a total transmit power of the first network and the second network and/or the uplink duty cycle of the second network, causing a SAR value of the terminal device to be less than or equal to a preset value.

Optionally, in some embodiments, the uplink duty cycle of the second network is scheduled by a network device in the second network, or is determined autonomously by the terminal device.

Optionally, in some embodiments, the terminal device 300 further includes an acquiring module, configured to acquire a current uplink-downlink ratio of the first network; a determining module, configured to determine the maximum uplink duty cycle of the second network according to the current uplink-downlink ratio of the first network, and a correspondence between uplink-downlink ratios of the first network and maximum uplink duty cycles of the second network; and a communication module, configured to report the maximum uplink duty cycle of the second network to a network device of the second network.

Optionally, in some embodiments, the correspondence includes a plurality of first correspondences, and each of the first correspondences corresponds to a maximum transmit power of the first network and a maximum transmit power of the second network, the determining module is specifically configured to determine the maximum uplink duty cycle of the second network according to the maximum transmit power of the first network, the maximum transmit power of the second network, the current uplink-downlink ratio of the first network, and the plurality of first correspondences.

Optionally, in some embodiments, the determining module is further configured to: determine the plurality of first correspondences.

Optionally, in some embodiments, the determining module is further configured to determine, by adjusting an uplink ratio of the second network when the first network transmits a signal at a specific maximum transmit power and the second network transmits a signal at a specific maximum transmit power, a target uplink duty cycle of the second network when the SAR value reaches the preset value; and determine the target uplink duty cycle of the second network as the maximum uplink duty cycle of the second network corresponding to a first uplink-downlink ratio, wherein the first uplink-downlink ratio is a current uplink-downlink ratio of the first network.

Optionally, in some embodiments, the specific maximum transmit power of the first network is 23 dBm or 26 dBm, and the specific maximum transmit power of the second network is 23 dBm or 26 dBm.

Optionally, in some embodiments, the processing module 310 is specifically configured to: reduce a power value or a power class of the total transmit power.

Optionally, in some embodiments, the processing module 310 is specifically configured to: preferentially reduce, when reducing the total transmit power, a transmit power of the second network.

Optionally, in some embodiments, the processing module 310 is further configured to disconnect from the second network while preserving a connection with the second network.

Optionally, in some embodiments, the processing module 310 is specifically configured to disconnect from the second network when the uplink ratio of the second network is greater than a first threshold.

Optionally, in some embodiments, the first threshold is 50%.

Optionally, in some embodiments, the first network is an LTE network, and the second network is an NR network.

FIG. 4 is a block diagram illustrating a communication device 600 according to an embodiment of the application. The communication device 600 shown in FIG. 4 includes a processor 610, which can call and run a computer program from a memory to implement the method according to the embodiments of the application.

Optionally, as shown in FIG. 4, the communication device 600 may further include a memory 620. The processor 610 may call and run the computer program from the memory 620 to implement the method according to the embodiments of the application.

The memory 620 may be a separate device independent of the processor 610, or may be integrated in the processor 610.

Optionally, as shown in FIG. 4, the communication device 600 may further include a transceiver 630, and the processor 610 may control the transceiver 630 to communicate with other devices. Specifically, it may send information or data to other devices, or receive other information, data sent by the device.

The transceiver 630 may include a transmitter and a receiver. The transceiver 630 may further include antennas, and the number of antennas may be one or more.

Optionally, the communication device 600 may be the terminal device according to an embodiment of the application, and the communication device 600 may implement a corresponding process implemented by the terminal device in each method according to the embodiments of the application, which will be not repeated here for brevity.

Figure 5:
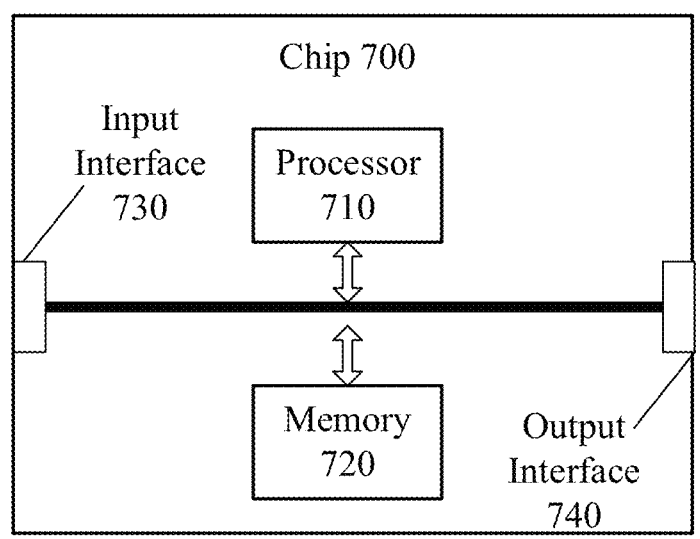
FIG. 5 is a block diagram of a chip according to an embodiment of the application.

FIG. 5 is a block diagram illustrating a chip according to an embodiment of the application. The chip 700 shown in FIG. 5 includes a processor 710, which can call and run a computer program from a memory to implement the method according to the embodiments of the application.

Optionally, as shown in FIG. 5, the chip 700 may further include a memory 720. The processor 710 may call and run the computer program from the memory 720 to implement the method according to the embodiments of the application.

The memory 720 may be a separate device independent of the processor 710, or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to the other devices or chips.

Optionally, the chip can be applied to the terminal device according to the embodiments of the application, and the chip can implement the corresponding process implemented by the terminal device in the method according to the embodiments of the application. For brevity, details are not described herein.

It should be understood that the chip mentioned in some embodiments of the application may also be referred to as a system-level chip, a system chip, a chip system or a system-on-chip.

It should be understood that the processor in the embodiments of the disclosure may be an integrated circuit chip with signal processing capability. In the implementation process, the steps of the foregoing method embodiments can be completed by hardware integrated logic circuits in the processor or instructions in the form of software. The processor mentioned in some embodiments of the application may be a general-purpose processor, a digital signal processor (DSP), an application specific integrated circuit (ASIC), a field programmable gate array (FPGA), or other programming logic devices, discrete gate or transistor logic devices, discrete hardware components, which can achieve or implement the methods, steps and block diagrams disclosed in embodiments of the disclosure. The general-purpose processor may be a microprocessor or the processor may be any conventional processor or the like. The steps of the method disclosed in the embodiments of the disclosure may be directly embodied as being executed and completed by a hardware decoding processor, or executed and completed by a combination of hardware and software modules in the decoding processor. The software module can be located in a mature storage medium in the art, such as random access memory, flash memory, read-only memory, programmable read-only memory, or electrically erasable programmable memory, registers. The storage medium is located in the memory, and the processor reads the information in the memory and completes the steps of the above method in combination with its hardware.

The memory mentioned in some embodiments of the application may be a volatile memory or a non-volatile memory, or may include both volatile and non-volatile memory. In some embodiments, the non-volatile memory may be read-only memory (ROM), programmable read-only memory (PROM), erasable programmable read-only memory (erasable PROM, EPROM), electrical memory erasable programmable read-only memory (EPROM, EEPROM) or flash memory. The volatile memory may be a random access memory (RAM), which is used as an external cache. By way of exemplary but not restrictive illustration, many forms of RAM are available, for example, static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synch link dynamic random access memory (synch link DRAM, SLDRAM), and direct Rambus random access memory (direct Rambus RAM, DR RAM) and so on. It should be noted that the memories in the systems and methods described herein are intended to include, but are not limited to, these and any other suitable types of memories.

It should be understood that the foregoing memories are exemplary but not restrictive. For example, the memory in the embodiments of the disclosure may also be static random access memory (static RAM, SRAM), dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), and the like. In other words, the memory in the embodiments of the disclosure is intended to include, but is not limited to, these and any other suitable types of memory.

Embodiments of the disclosure further provide a computer readable storage medium, which is configured to store a computer program.

Optionally, the computer readable storage medium may be applied to the network device in some embodiments of the application, and the computer program causes the computer to execute the corresponding process implemented by the network device in each method in some embodiments of the application. For the sake of brevity, details will not be repeated here.

Optionally, the computer readable storage medium may be applied to the mobile terminal/terminal device in some embodiments of the application, and the computer program causes the computer to execute the corresponding process implemented by the mobile terminal/terminal device in each method in some embodiments of the application. For the sake of brevity, details will not be repeated here.

A computer program product is also provided in some embodiments of the application, including computer program instructions.

Optionally, the computer program product can be applied to the network device in some embodiments of the application, and the computer program instruction causes the computer to execute a corresponding process implemented by the network device in each method in some embodiments of the application. For the sake of brevity, details will not be repeated here.

Optionally, the computer program product can be applied to the mobile terminal/terminal device in some embodiments of the application, and the computer program instruction causes the computer to execute a corresponding process implemented by the mobile terminal/terminal device in each method in some embodiments of the application. For the sake of brevity, details will not be repeated here.

A computer program is also provided in some embodiments of the application.

Optionally, the computer program may be applied to the network device in some embodiments of the application. When the computer program is run on a computer, the computer is caused to execute a corresponding process implemented by the network device in each method in some embodiments of the application. For the sake of brevity, details will not be repeated here.

Optionally, the computer program may be applied to the mobile terminal/terminal device in some embodiments of the application. When the computer program is run on a computer, the computer is caused to execute a corresponding process implemented by the mobile terminal/terminal device in each method in some embodiments of the application. For the sake of brevity, details will not be repeated here.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments as described above are only exemplary. For example, the division of the units is only a logical function division, and there may be other divisions in actual implementation. For example, multiple units or components can be combined or integrated into another system, or some features can be ignored or not carried out. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, the functional units in the various embodiments of the disclosure may be integrated into one processing unit, or each unit may exist alone physically, or two or more units may be integrated into one unit.

If the functions are implemented in the form of software functional units and sold or used as an independent product, they can be stored in a computer-readable storage medium. Based on this understanding, an essential part of the technical solution of this application or, in other words, a part thereof that contributes to existing technology, or other parts of the technical solution can be embodied in the form of a software product. The computer software product is stored in a storage medium, including several instructions used for causing a computer device (which may be a personal computer, a server, or a network device, and the like) to perform all or part of the steps of the method described in some embodiments of the application. The foregoing storage medium includes various medium that can store program codes, such as a U disk, a mobile hard disk, a ROM, a RAM, a magnetic disk, or an optical disk.

The above content is only a specific implementation of the embodiments of the application, without limiting the protection scope of the embodiments of the application. Any modification or replacement conceived by those skilled in the art within the technical scope disclosed in some embodiments of the application should be covered within the protection scope of the embodiments of the application.

Therefore, the protection scope of the embodiments of the application shall be subject to the protection scope of the claims.

What is claimed is:

1. A method for wireless communication, applied to a terminal device connecting with a first network and a second network, comprising:
reducing, by the terminal device when an uplink duty cycle of the second network is greater than a maximum uplink duty cycle of the second network, at least one of a power class of the first network and the second network or the uplink duty cycle of the second network, wherein the uplink duty cycle of the second network is a proportion of time domain resources that can be used for uplink transmission in a time unit.

2. The method according to claim 1, wherein the uplink duty cycle of the second network is configured by a network device in the second network, or is determined autonomously by the terminal device.

3. The method according to claim 1, further comprising:
acquiring, by the terminal device, a current uplink-downlink ratio of the first network; and
determining, by the terminal device, the maximum uplink duty cycle of the second network according to the current uplink-downlink ratio of the first network, and a correspondence between uplink-downlink ratios of the first network and maximum uplink duty cycles of the second network.

4. The method according to claim 3, further comprising:
reporting, by the terminal device, the maximum uplink duty cycle of the second network to a network device of the second network.

5. The method according to claim 3, wherein the correspondence comprises a plurality of first correspondences, and
the determining, by the terminal device, the maximum uplink duty cycle of the second network according to the current uplink-downlink ratio of the first network, and a correspondence between uplink-downlink ratios of the first network and maximum uplink duty cycles of the second network comprises:
determining, by the terminal device, the maximum uplink duty cycle of the second network according to a maximum transmit power of the first network, a maximum transmit power of the second network, the current uplink-downlink ratio of the first network, and the plurality of first correspondences.

6. The method according to claim 5, further comprising:
determining, by the terminal device, the plurality of first correspondences.

7. The method according to claim 6, wherein the determining, by the terminal device, the plurality of first correspondences comprises:
determining, by adjusting an uplink ratio of the second network when the first network transmits a signal at a first maximum output power and the second network transmits a signal at a second maximum output power, a target uplink duty cycle of the second network when a specific absorption ratio (SAR) value reaches a preset value; and
determining the target uplink duty cycle of the second network as the maximum uplink duty cycle of the second network corresponding to a first uplink-downlink ratio, wherein the first uplink-downlink ratio is a current uplink-downlink ratio of the first network.

8. The method according to claim 7, wherein the first maximum output power is 23 dBm or 26 dBm.

9. The method according to claim 7, wherein the second maximum output power is 23 dBm or 26 dBm.

10. The method according to claim 1, wherein the first network is a long term evolution (LTE) network, and the second network is a new radio NR network.

11. A terminal device, connecting with a first network and a second network, comprising: a processor and a memory, wherein the memory is configured to store a computer program, and the processor, when calling and running the computer program stored in the memory, is configured to:
reduce, when an uplink duty cycle of the second network is greater than a maximum uplink duty cycle of the second network, at least one of a power class of the first network and the second network or the uplink duty cycle of the second network, wherein the uplink duty cycle of the second network is a proportion of time domain resources that can be used for uplink transmission in a time unit.

12. The terminal device according to claim 11, wherein the uplink duty cycle of the second network is configured by a network device in the second network, or is determined autonomously by the terminal device.

13. The terminal device according to claim 11, wherein the processor is further configured to:
acquire a current uplink-downlink ratio of the first network; and
determine the maximum uplink duty cycle of the second network according to the current uplink-downlink ratio of the first network, and a correspondence between uplink-downlink ratios of the first network and maximum uplink duty cycles of the second network.

14. The terminal device according to claim 13, further comprising a transceiver, wherein the processor is further configured to:
report, via the transceiver, the maximum uplink duty cycle of the second network to a network device of the second network.

15. The terminal device according to claim 13, wherein the correspondence comprises a plurality of first correspondences, and
the processor is further configured to:
determine the maximum uplink duty cycle of the second network according to a maximum transmit power of the first network, a maximum transmit power of the second network, the current uplink-downlink ratio of the first network, and the plurality of first correspondences.

16. The terminal device according to claim 15, wherein the processor is further configured to:
determine the plurality of first correspondences.

17. The terminal device according to claim 16, wherein the processor is further configured to:
determine, by adjusting an uplink ratio of the second network when the first network transmits a signal at a first maximum output power and the second network transmits a signal at a second maximum output power, a target uplink duty cycle of the second network when a specific absorption ratio (SAR) value reaches a preset value; and
determine the target uplink duty cycle of the second network as the maximum uplink duty cycle of the second network corresponding to a first uplink-downlink ratio, wherein the first uplink-downlink ratio is a current uplink-downlink ratio of the first network.

18. The terminal device according to claim 17, wherein at least one of the first maximum output power or the second maximum output power is 23 dBm or 26 dBm.

19. The terminal device according to claim 11, wherein the first network is a long term evolution LTE network, and the second network is a new radio NR network.

20. A chip, comprising: a processor, configured to call and run a computer program from a memory, thereby causing a terminal device provided with the chip to implement a method for wireless communication, wherein the terminal device is connected with a first network and a second network, and the method comprises:

reducing, when an uplink duty cycle of the second network is greater than a maximum uplink duty cycle of the second network, at least one of a power class of the first network and the second network or the uplink duty cycle of the second network, wherein the uplink duty cycle of the second network is a proportion of time domain resources that can be used for uplink transmission in a time unit.

* * * * *